United States Patent Office 2,953,592
Patented Sept. 20, 1960

2,953,592

METHOD OF PRODUCING ESTERS OF BORIC ACID

Frank J. Sowa, 305 E. 46th St., Cranford, N.J.

No Drawing. Filed May 7, 1958, Ser. No. 733,466

8 Claims. (Cl. 260—462)

This application is a continuation-in-part of copending application Serial No. 547,840, filed November 18, 1955, now Patent No. 2,834,999 and is directed to methods of producing esters of boric acid.

As described in said copending application, the action of boron trifluoride upon alcoholic solutions of urea differs markedly from that of the other boron halides. Thus boron trifluoride reacts with urea and alcohols at elevated temperatures to form esters of carbamic and carbonic acids as described in the above identified application while at lower temperatures, new complexes of urea and boron trifluoride are produced as described in copending application Serial No. 442,911.

In contrast with boron trifluoride, other boron halides react with alcoholic solutions of urea to form the corresponding borate esters as represented by the equation

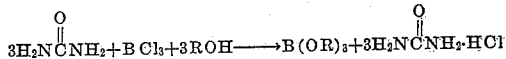

It has, in fact, been found that the latter type of reaction is generic in character and can be used to produce a whole series of organic borates by reacting boron trichloride with ROH compounds in the presence of dehydrohalogenating agents such as amines and amides.

Accordingly, the object of the present invention is to provide novel methods for producing esters of boric acid.

The ROH compounds used in forming the boric acid esters may be any alcohol such as methyl, ethyl, propyl, butyl, octyl and stearyl alcohol. Cyclo alcohols such as cyclohexanol may also be used as well as unsaturated alcohols such as allyl alcohol. It is also possible to use aryl ROH compounds such as phenols, cresols and naphthols. The alcohols may be primary, secondary or tertiary alcohols and polyhydric alcohols such as glycerols and glycols may be employed in forming borate esters in accordance with the present invention.

The dehydrohalogenating agents used may be any of various amines and amides such as urea, thiourea, formamide, acetamide, and other aliphatic amides, although for most purposes, urea is preferred.

The invention also may be employed when using boron halides other than boron trichloride. Thus, boron tribromide and boron triiodide may be used if desired.

The reactions of the present invention also may be varied to replace either one, two or three halides with ester groups and, therefore, it is possible to produce the compounds $$BCl_2OR; \; BCl(OR)_2 \; or \; B(OR)_3$$

Ordinarily, in carrying out the reactions of the present invention, the temperature of the reaction mixture is maintained below 100° C. and since the reaction is exothermic, some cooling may be necessary. The preferred temperatures maintained when using urea and boron trichloride in carrying out the reaction are from about 30 to 50° C. In the case of sensitive alcohols, such as the tertiary alcohols, reaction temperatures well below 30° C. are sometimes desirable.

In producing the triesters of boric acid, from about 3 to 10 mols of the ROH compound are employed for each mol of the boron trihalide. The amount of the dehydrohalogenating agent used may be substantially in excess of that theoretically required, although when using urea, it is found that one molecule of urea may combine with several molecules of the liberated HCl to form additional compounds which may be represented by the formula

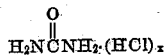

wherein $x$ is 1, 2, 3 or a larger number. Nevertheless, as much as 4 mols, or as little as 0.5 mol, of the dehydrohalogenating agent may be used for each mol of the boron trihalide employed.

In order to indicate typical procedures used in carrying out the present invention, the following examples are cited.

Example I 180.2 grams (3 mols) of urea and 480.7 grams (8 mols) of isopropyl alcohol were placed in a three necked flask equipped with a condenser, stirring rod, delivery tube and thermometer. 234.4 grams (2 mols) of boron trichloride were then bubbled into the reaction mixture over a period of 3 hours while holding the temperature below 37° C. by cooling the reaction flask in a water bath. As the reaction proceeded, the mixture formed into three layers, the uppermost layer was substantially pure triisopropyl borate. It distilled at 138-143° C. and weighed 301 grams which represented a yield of 80%. The second layer was a mixture of the complexes of urea and hydrogen chloride in alcohol. The lower layer was the solid precipitated adduct of urea and hydrogen chloride and is hygroscopic. The solid material and the liquid layer were mixed with an excess of isopropanol and the mixture was then refluxed whereupon isopropyl chloride was formed and isolated. By thus removing the major portion of the hydrogen chloride from the urea, the latter was again usable for future reaction as a dehydrohalogenating agent.

Example II 114.1 grams (1.5 mols) of thiourea and 293 grams (4 mols) of isopropanol were mixed together and 117 grams (1 mol) of boron trichloride was bubbled into the mixture over a period of about 3 hours while holding the temperature below 40° C. The isopropyl borate separated in substantially pure form as an upper layer. The reaction was handled as in Example I and 142 grams of triisopropyl borate were obtained which distilled at 135 to 140° C.

Example III 22.5 grams (0.5 mol) of formamide and 360.5 grams (6 mols) of isopropanol were mixed together after which 116 grams (.98 mol) of boron trichloride were passed into the mixture as in Example I. The clear upper layer was fractionally distilled. The fraction that boiled at about 140° C. was identified as triisopropyl borate. A yield of 92 grams was obtained.

Example IV

The reaction of Example I was repeated maintaining the temperature below 20° C. using 246 grams (4.7 mols) of tertiary butyl alcohol, 30 grams (0.5 mol) of urea, and 89.9 (.78 mol) of boron trichloride. Tri-tertiary-butyl borate boiling at 45-50° C. (41 mm.) was thereby obtained.

Example V 282 grams (3 mols) of phenol and 120 grams (2 mols) of urea were mixed with 113 grams of benzene in a three necked flask. 82 grams (0.70 mol) of boron trichloride were passed into the mixture while keeping the temperature below 45° C. The benzene was then distilled off and the hot liquid filtered, whereby 90 grams of triphenyl borate were obtained having a melting point of 50° C. and boiling at 165° C. under 1 mm. pressure.

Example VI

The reaction of Example I was repeated using 192 grams (6 mols) of methanol, 30 grams (0.5 mol) of urea and 95.6 grams (0.8 mol) of boron trichloride whereby a yield of 77% of the theoretical amount of trimethyl borate boiling at 69° C. was obtained.

Example VII

The reaction of Example I may also be carried out when using boron tribromide. In this case, 442 grams (6 mols) of butanol and 180 grams (3 mols) of urea are mixed together, after which 250 grams (1 mol) of boron tribromide are added. The reaction temperature was maintained below 30° C. whereby tributyl borate is obtained in a yield of about 80% of theory.

The foregoing examples of practice which may be employed in carrying out the present invention indicate the general application of the invention in forming esters of boric acid. However, the proportions of the reactants and the conditions under which the reactions may be carried out are capable of many changes and modifications. In view thereof, it should be understood that the examples cited above and the procedures described are intended to be illustrative only and are not intended to limit the scope of the invention.

I claim:

1. The method of producing esters of boric acid which comprises the steps of introducing a boron trihalide selected from the group consisting of the chlorides, bromides and iodides of boron into reaction contact with a compound having the formula ROH where R is a hydrocarbon radical and the compound is selected from the group consisting of alkanols, alkenols, cyclo-alkanols, aryl hydroxy compounds, glycerols and glycols in the presence of a dehydrohalogenating agent selected from the group consisting of aliphatic amides, urea and thiourea.

2. The method of producing esters of boric acid which comprises the steps of mixing a dehydrohalogenating agent selected from the group consisting of aliphatic amides, urea and thiourea, with a compound having the formula ROH where R is a hydrocarbon radical and the compound is selected from the group consisting of alkanols, alkenols, cyclo-alkanols, aryl hydroxy compounds, glycerols, and glycols and passing boron trichloride into the mixture.

3. The method of producing esters of boric acid which comprises the steps of mixing a dehydrohalogenating agent selected from the group consisting of aliphatic amides, urea and thiourea, with a compound having the formula ROH where R is a hydrocarbon radical and the compound is selected from the group consisting of alkanols, alkenols, cyclo-alkanols, aryl hydroxy compounds, glycerols, and glycols and passing boron trichloride into the mixture while maintaining the mixture at a temperature below about 100° C.

4. The method of producing a trialkyl borate which comprises mixing an alkanol with a dehydrohalogenating agent selected from the group consisting of aliphatic amides, urea and thiourea, and passing boron trichloride into the mixture.

5. The method of producing a trialkyl borate which comprises mixing an alkanol with a dehydrohalogenating agent selected from the group consisting of aliphatic amides, urea and thiourea and passing boron trichloride into the mixture while maintaining the reaction temperature below about 50° C.

6. The method of producing alkyl borates which comprises passing boron trichloride into an alkanolic solution of urea.

7. The method of producing alkyl borates which comprises passing boron trichloride into an alkanolic solution of urea while maintaining the reaction temperature below about 50° C.

8. The method of producing alkyl borates which comprises mixing from 0.5 to 4 mols of urea with from 3 to 10 mols of an alkanol and passing about 1 mol of boron trichloride into the mixture while maintaining the reaction temperature below about 50° C.

References Cited in the file of this patent

Gerrard et al.: Chemistry and Industry, pages 53–55 (1952).